(No Model.)
T. J. NEACY.
SPROCKET WHEEL.
No. 457,420. Patented Aug. 11, 1891.
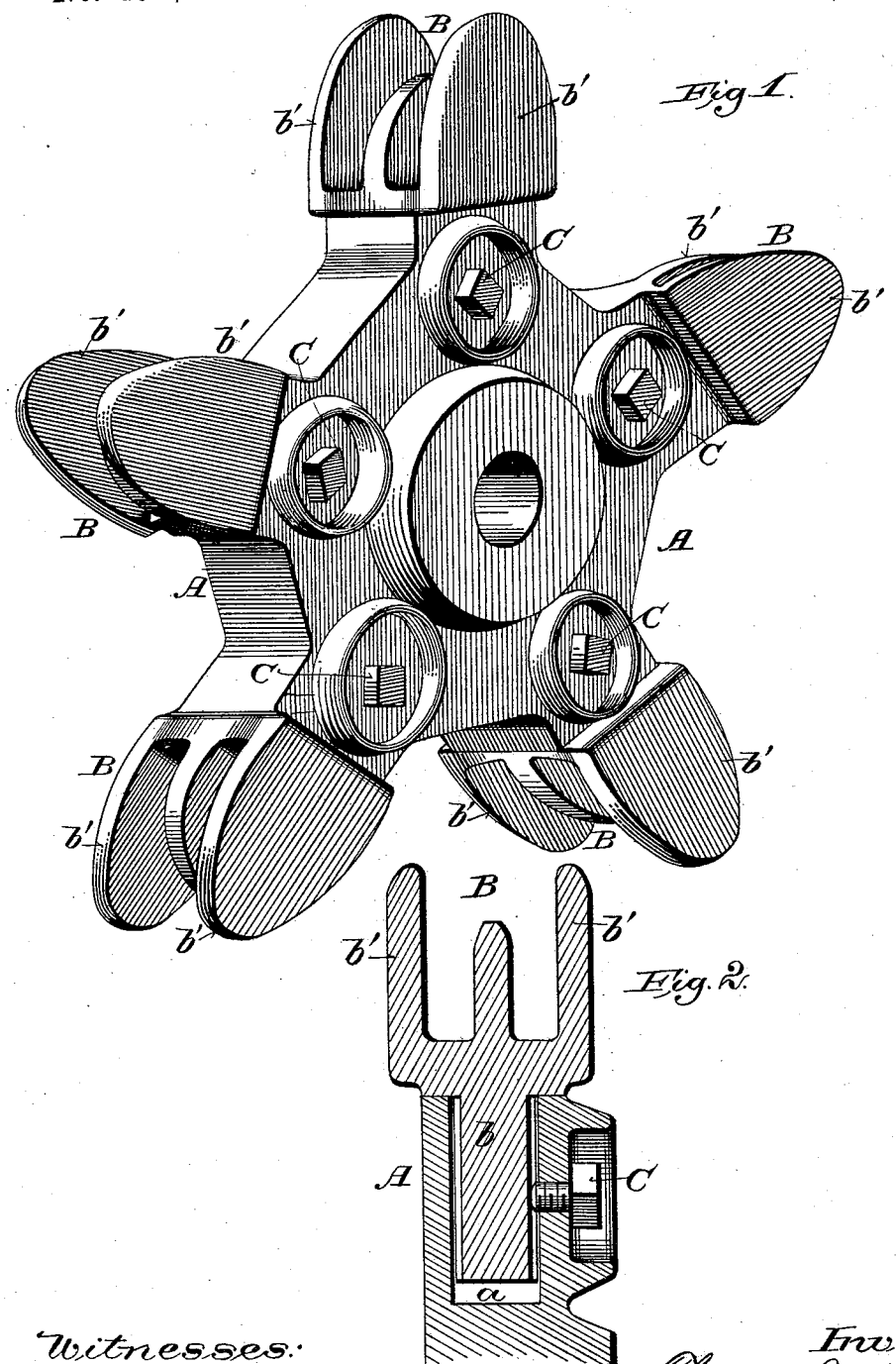

UNITED STATES PATENT OFFICE.

THOMAS J. NEACY, OF MILWAUKEE, WISCONSIN.

SPROCKET-WHEEL.

SPECIFICATION forming part of Letters Patent No. 457,420, dated August 11, 1891.

Application filed March 31, 1890. Serial No. 346,027. (No model.)

*To all whom it may concern:*

Be it known that I, THOMAS J. NEACY, of Milwaukee, in the county of Milwaukee and State of Wisconsin, have invented certain new and useful Improvements in Sprocket-Wheels; and I do hereby declare that the following is a full, clear, and exact description of the invention, which will enable others skilled in the art to which it pertains to make and use the same, reference being had to the accompanying drawings, and to the letters of reference marked thereon, which form a part of this specification.

The main object of my invention is to retain the chain upon the sprocket-wheel by guiding and holding the links properly upon the sprockets.

It consists, essentially, of providing outwardly-projecting ears on each side of the sprocket.

In the accompanying drawings like letters designate the same parts in both figures.

Figure 1 is a perspective view of a sprocket-wheel embodying my improvements, and Fig. 2 is a radial cross-section taken through one of the sprockets and the adjacent portion of the sprocket-wheel.

A represents the wheel proper formed in the usual manner at intervals with sockets $a$ in its periphery for the reception of the shanks $b$ of the sprockets B, which are adjustably held therein by set-screws C C. The sprockets B are provided on each side with outwardly-projecting ears $b'$ $b'$, which preferably extend beyond the points of the sprockets themselves. These ears may be formed separately and attached to the base or shank of the sprocket, and may be employed with sprockets formed integrally with the wheel.

It often occurs with sprocket-wheels constructed in the usual manner that one side of a link of the chain will strike the point of the sprocket and the chain will thereby be thrown off from the wheel. With the ears constituting my improvement this becomes impossible, since a link if turned so as not to pass over the sprocket in the proper position will be guided into place and seated in the recesses between the sprocket and said ears.

I claim—

1. A sprocket-wheel provided with ears at each side of and directly opposite the sprockets to guide and retain the chain thereon, said sprocket-wheel having clear lateral spaces between the sprockets, substantially as and for the purposes set forth.

2. A sprocket-wheel provided with ears at each side of and directly opposite the sprockets, said ears projecting outwardly beyond the sprockets, so as to guide and retain the chain thereon, substantially as and for the purposes set forth.

3. In a sprocket-wheel, the combination, with the wheel proper formed with sockets in its periphery for the reception of the shanks of the sprockets, of removable sprockets formed with shanks for attachment to the wheel and provided with ears at each side of and projecting outwardly beyond the sprockets, so as to guide and retain the chain thereon, substantially as and for the purposes set forth.

In testimony that I claim the foregoing as my own I affix my signature in presence of two witnesses.

THOMAS J. NEACY.

Witnesses:
CHAS. L. GOSS,
WALTER READ.